United States Patent [19]

Kawaguchi et al.

[11] 4,058,084
[45] Nov. 15, 1977

[54] SEALING AND ADJUSTING MEANS IN A DISK BRAKE

[75] Inventors: Hiroshi Kawaguchi; Kohji Nishikawa, both of Susono, Japan

[73] Assignee: Toyota Jidosha Kogyo Kabushiki Kaisha, Japan

[21] Appl. No.: 715,542

[22] Filed: Aug. 18, 1976

[30] Foreign Application Priority Data

Apr. 10, 1976 Japan .............................. 51-44519[U]

[51] Int. Cl.² .............................................. F16D 65/52
[52] U.S. Cl. ................................ 188/71.8; 188/196 P; 192/111 A; 277/102
[58] Field of Search .......................... 188/71.8, 196 P; 192/111 A, 70.25; 277/85, 86, 87, 102, 114

[56] References Cited

U.S. PATENT DOCUMENTS

| 3,112,014 | 11/1963 | Jeffries | 188/196 P |
| 3,186,521 | 6/1965 | Chouings | 188/71.8 X |
| 3,255,846 | 6/1966 | Livezey | 188/196 P X |
| 3,377,076 | 4/1968 | Burnett | 188/71.8 |

FOREIGN PATENT DOCUMENTS

| 2,320,291 | 4/1974 | Germany | 188/71.4 |
| 2,326,047 | 12/1973 | Germany | 188/196 P |
| 1,043,331 | 9/1966 | United Kingdom | 188/196 P |

Primary Examiner—George E. A. Halvosa
Attorney, Agent, or Firm—Browdy and Neimark

[57] ABSTRACT

A sealing member in a disk brake, in which a piston fitted in a cylinder is to urge a friction pad onto a rotating disk, includes a sealing ring disposed in a circumferential groove provided in the cylinder or on the piston. A spring member is disposed between the forward surface of the sealing ring and the forward wall of the groove for constantly biasing the sealing ring backwardly in order to return the piston substantially to the same position when the brake is released, regardless of the magnitude of the braking pressure applied, while preserving the function of automatic compensation for the wearing of the friction pad.

24 Claims, 15 Drawing Figures

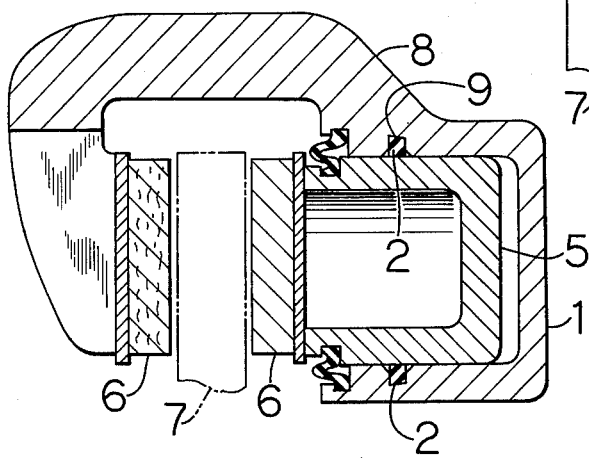
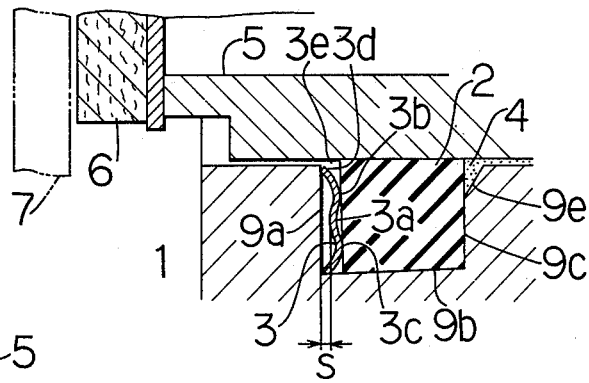
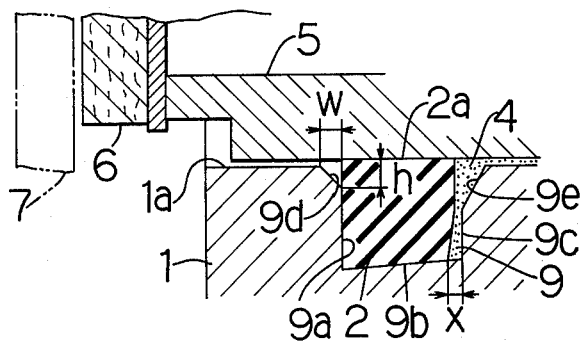
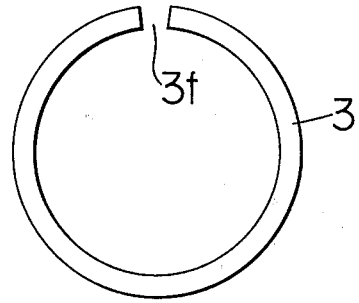
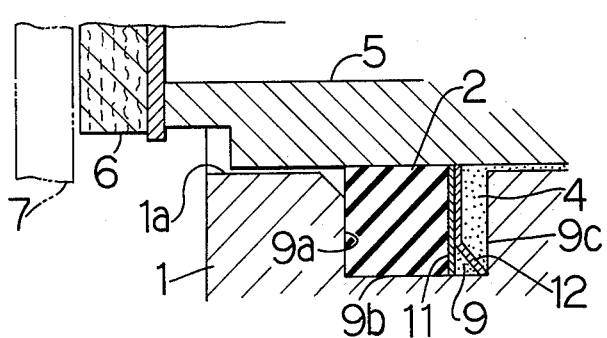
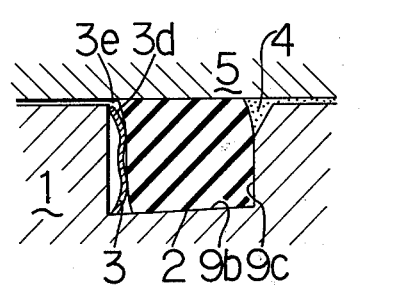
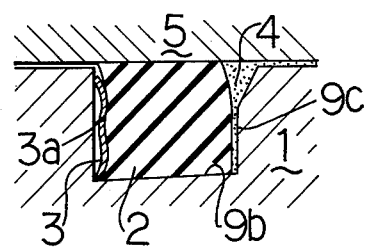

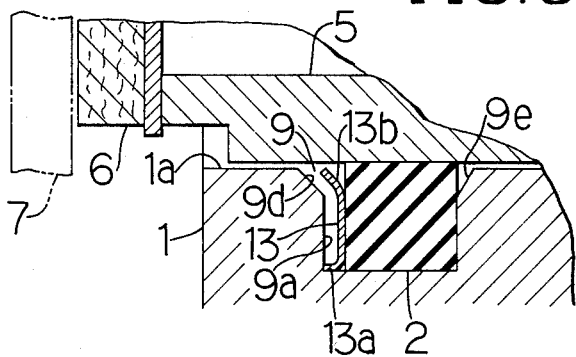
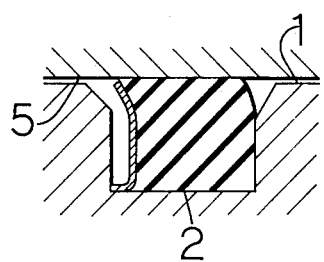
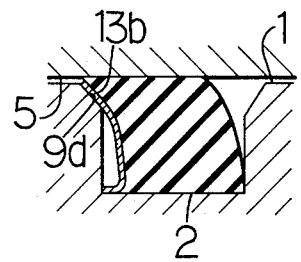
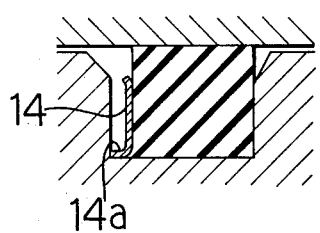
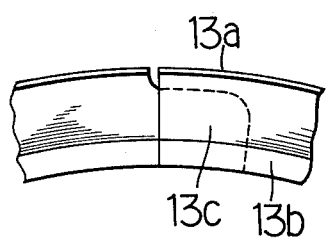
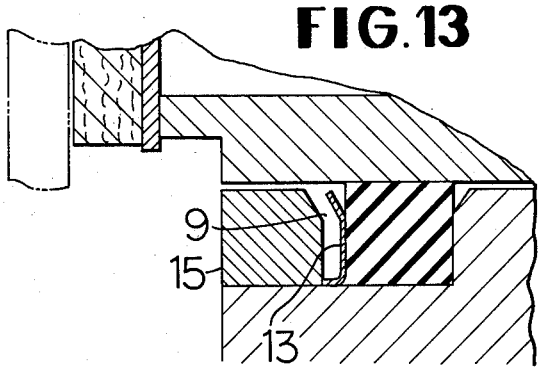
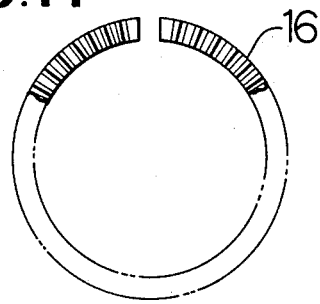

SEALING AND ADJUSTING MEANS IN A DISK BRAKE

BACKGROUND OF THE INVENTION

The present invention relates to an improvement of a sealing means disposed between the cylinder and the piston of a disk brake, which sealing means has well-known double functions, i.e., restoration to a certain to-be-retained position of the piston and the automatic adjustment of the brake clearance in the case of the pad wearing, while preserving the essential function of fluid tightness.

In conventional disk brakes the returned position of the brake has been apt to be influenced by the difference of the brake fluid pressure applied, resulting in so-called "drag" and/or difference of the fluid amount required for a successive brake action. Both drag and difference in fluid amount are distinct disadvantages.

SUMMARY OF THE INVENTION

The present invention is aimed at a perfect elimination of the disadvantages involved in the conventional devices. In other words, a primary object of this invention is to provide an ideal sealing ring to concomitantly function in maintaining the fluid tightness as well as in returning the piston to the original position while perfectly precluding the unreliability in the retraction of the piston, that is, the drag and the variation of braking fluid amount of disk brakes.

Another object of this invention is to eliminate the disadvantages involved in the conventional devices while maintaining the advantage of simple structure thereof as much as possible.

Still another object of this invention is to eliminate an undesirable axial play present between the sealing ring and a groove, without sacrificing the simplicity of fitting the sealing ring in the groove, for preventing the variation of the braking fluid amount.

A further object of this invention is to preclude a so-called shake back phenomenon of the piston due to the vibration of the brake.

DETAILED DESCRIPTION OF THE INVENTION

These and other object of the present invention will become apparent from the following description of embodiments, which are only by way of example and not for limiting the scope of the invention, referring to the drawings wherein:

FIG. 1 is a sectional elevation of an essential part of a disk brake having a conventional sealing means;

FIG. 2 is cross sectional view of an essential part of an example of conventional sealing means;

FIG. 3 is a similar view to FIG. 2 of another example of conventional sealing means;

FIG. 4 is a cross sectional view of an embodiment in accordance with this invention;

FIG. 5 is a front view of a corrugated spring used in the means shown in FIG. 4;

FIGS. 6 and 7 are respectively an explanatory view showing the operational conditions of the means illustrated in FIG. 4;

FIG. 8 is a cross sectional view of essential part of another embodiment in accordance with this invention;

FIGS. 9 and 10 are respectively an explanatory view showing the operational conditions of the embodiment illustrated in FIG. 8;

FIG. 11 is a cross sectional view of an essential part of still another embodiment in accordance with this invention;

FIG. 12 is a front view of an essential part of a spring used in still another embodiment in accordance with this invention;

FIG. 13 is a cross sectional view of an essential part of a further different embodiment in accordance with this invention;

FIG. 14 is a front view of a spring used in still another embodiment; and

DETAILED DESCRIPTION OF THE PREFERRED EMBODIMENTS

Figure 15:
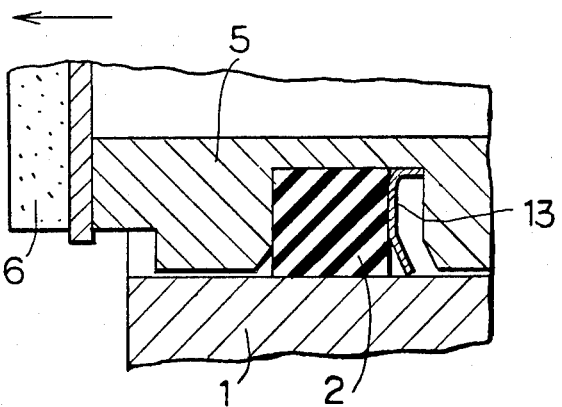
FIG. 15 is a cross-sectional view of yet another embodiment of the present invention.

Before discussing the preferred embodiments of the invention, major problems involved in the conventional disk brakes are to be described in detail making reference to FIGS. 1 and 2. As shown in FIG. 1, a cylinder 1 is integrally formed with the yoke 8 which straddles a disk 7 to rotate with a wheel of a vehicle. In the cylinder 1 is slidably fitted a piston 5 which is advanced for urging a friction pad 6 onto the disk 7 when a braking pressure is applied to the cylinder 1, to decelerate or stop the vehicle. In a circumferential groove 9 formed on the internal periphery 1a of the cylinder 1 is fitted a sealing ring 2. The groove 9 is of a substantially rectangular shape in cross section defined by a forward wall 9a, bottom wall 9b and rearward wall 9c. The sealing ring 2 is fitted therein, with a certain predetermined amount of bottomward compressibility, for tightly sealing the operation fluid under pressure supplied between the cylinder 1 and the piston 5. On the forward wall 9a and the rearward wall 9c of the groove 9 are disposed respectively a chamfered portion 9d and 9e.

When a braking pressure is applied into the cylinder 1 the piston 5 is advanced to urge the friction pad 6 onto the disk 7, and at the same time, the sealing ring 2 is elastically deflected to generate an elastic force which retracts the piston 5 to the original position when the pressure is released. When the friction pad 6 has been worn in excess of the elastic deflection limit of the sealing ring 2, a sliding of the piston 5 corresponding to the amount of wearing of the friction pad 6 will occur against the internal periphery 2a of the sealing ring 2; consequently a constant clearance substantially equal to the elastic deflection amount can be maintained between the friction pad 6 and the disk 7 when the braking pressure has been released.

The abovementioned is a basic principle of the conventional sealing ring; it is fairly difficult, however, to realize such an ideal sealing means in fact. The drag and/or the variation of braking fluid amount has been inevitably involved to bring about a resulting variation of brake travel and other incidental troubles.

First of all the drag problem is to be discussed, which being defined as a phenomenon wherein a friction pad being constantly urged onto a disk at a certain pressure even after the release of braking pressure. It is said to be mostly caused by the elastic deflection of the brake components such as the yoke (hereinafter simply referred to as brake components deflection). The drag is apt to cause undesirable power loss, short life of the friction pad 6, overheating of the brake system, etc.; for eliminating the phenomenon it is required to fully increase the elastic deflection capacity of the sealing ring 2, which is subjected to the following difficulties.

In conventional sealing rings the elastic deflection capacity depends on the size of chamfered portion 9d, which naturally requires an enlargement of the chamfered portion 9d; when the size, which is a product of the height h and the width w, of the chamfered portion 9d is increased it will be difficult for the groove to retain the sealing ring stably. Therefore, as the size is kept small, the chamfered portion 9d will be soon filled up by the deflected part of the ring 2 while the braking pressure is still low; and as the braking pressure is raised to cause the deflection limit of the ring to be surpassed by the amount of the brake components deflection, the piston 5 will be slidingly moved over the ring 2 not to be retracted to the original position after the release of the braking pressure, and on the contrary, will be pushed outwards by the elastic force of the ring due to recovering of the brake components deflection. This phenomenon is named drag.

For the prevention of this drag an increase of the elastic deflection ability of the ring 2 is required, which is, however, difficult in the conventional sealing means to be realized without sacrificing the durability thereof.

Now as regards the variations of the amount of braking fluid is to be discussed.

While the braking pressure is still low the chamfered portion 9d is already filled up with the deflected part of the ring, in the conventional sealing means, and further deflection thereof will be hampered. The brake components deflection amount varies, on the other hand, in proportion to the braking pressure, which causes the variation of brake clearance, and in turn, provides an important cause of variation in the amount of braking fluid supplied to the cylinder in ensuing braking operations, that is, amount of braking fluid.

In sealing rings of the type in which generation of elastic force is expected along with the function of maintaining the fluid tightness, there is another cause of producing a variation of braking fluid amount. In order to make the sealing ring 2 serve as a preserver of fluid tightness as well as a retractor of the piston 5, it should be disposed in the groove 9 in a bottomwardly fairly well compressed state; for a disposition thereof in a bottomwardly compressed state it is required to have a clearance x, as shown in FIG. 2, between the groove 9 and the sealing ring 2 to accommodate an accompanying expansion thereof in the axial direction. Under existance of the clearance x the sealing ring 2 will be able to make a slight lateral movement, which causes a variation of braking fluid amount through the variation of the clearance, i.e. that between the ring 2 and the rearward wall 9c of the groove 9.

This variation in the amount of braking fluid largely affects a stroke of the brake travel, because the cylinder diameter in disk brakes is generally larger in comparison to that in drum type brakes, which consequently results in a shorter piston stroke. Among the two causes of variation in braking fluid amount, for the abovementioned lateral movement of the ring 2 in the groove 9 a couple of countermeasures, shown in FIGS. 2 and 3, have been known as later described, but for the deficient elastic deflection capacity of the sealing ring no measures are known. (a) One of which measures is shown in FIG. 2 wherein the bottom wall 9b of the groove 9 is inclined in the axial direction of the cylinder 1; the sealing ring 2 constantly tends to settle itself leaning to the deeper side of the groove 9. (b) The other is shown in FIG. 3 wherein a back-up plate 11 and a leaf spring 12 abutting thereto are inserted between the sealing ring 2 and the rearward wall 9c of the groove 9; the spring 12 constantly urges the sealing ring 2 via the back-up plate 11 toward the forward wall 9a of the groove 9.

In FIG. 4 an embodiment of this invention is represented, wherein like parts as in the conventional means shown in FIG. 2 are attached like signs and reference numerals for simplifying the explanation. The principal difference between this embodiment and the conventional means in FIG. 2 lies in a disposition of a corrugated spring 3 between the sealing ring 2 and the forward wall 9a of the groove 9, which spring 3 being of annular shape as a whole and provided with a break 3f in a part thereof as shown in FIG. 5. The break 3f of the corrugated spring 3 is for facilitating the fitting thereof into the groove 9 as well as the elastic deflection thereof in the case of brake applying. To be particularly exact, the corrugated spring 3 is arcuated or of bow-shape, that is, convex toward the sealing ring 2 with a slight concavity 3a in the center thereof, which concavity being formed for more stable retention of the sealing ring 2 with the convexities 3b and 3c thereon and easier elastic deflection of the spring 3. The elastic deflection amount of the spring 3 depends upon the distance S between the concavity 3a and the forward wall 9a of the groove 9.

The foot 3d of the corrugated spring 3 and the chamfered portion 9e on the rearward wall 9c of the groove 9 in this embodiment serve as guides for the sealing ring 2 to be easily fitted; furthermore the spring 3 allows the sealing ring 2 to be fitted in the groove 9 without having any axial play, because the sealing ring 2 can be bottomwardly compressed, when the piston 5 is fitted into the cylinder 1, due to the absorption by the elastic deflection of the corrugated spring 3 of the lateral expansion of the ring 2 (i.e., expansion in the axial direction of the piston 5). It can be understood from the abovementioned description that the same effect is to be obtained in this embodiment as the well known effect of the conventional device shown in FIG. 3.

Further effects of this embodiment reside rather in the following operational conditions, which are shown in FIGS. 6 and 7 as working conditions of the sealing means in FIG. 4. FIG. 6 indicates deflection of the sealing means under a relatively low braking pressure, wherein the piston 5 advances a distance substantially identical to the brake clearance and the sealing ring 2 is deflected that much due to shear forces, because of the brake components deflection scarcely takes place in this case. When the braking pressure has been released the piston 5 is retracted exactly the same distance as it advanced while the brake applied.

When the braking pressure is high the corrugated spring 3 is elastically deflected along with the sealing ring 2. The elastic deflection of the spring 3 in this case increases in proportion to the rising of the braking pressure. A relative advance of the piston 5 with respect to the cylinder 1, caused by the brake components deflection which is likewise proportionally increased by the rising of braking pressure, is absorbed by both elastic deflection of sealing ring 2 and corrugated spring 3; consequently a sliding between the sealing ring 2 and the piston 5 can not take place. Retraction of the piston 5 exactly the same distance as the advance in the brake application can be assured when the braking pressure has been released.

When the circular recess 3e between the sealing ring 2 and foot 3d of the spring 3 becomes filled by the sealing ring 2 due to the elastic deflection thereof, and an abutment of the concavity 3a of the corrugated spring 3 with the forward wall 9a of the groove 9 take place, due to wear of the friction pad 6, etc., a slide between the sealing ring 2 and the piston 5 will occur to automatically perform the brake clearance adjustment.

The piston restoring force which has been solely depending on the elastic deflection of the sealing ring 2 can be partially provided or burdened by the corrugated spring 3, which can alleviate the deflection of the sealing ring 2, and in turn, allow the conversion of material thereof into a relatively hard matter. Therefore, it has become possible to provide a sealing ring 2 which is not subjected to a large deflection under the braking pressure and is capable of having an ample frictional force between itself and the piston 5, by providing a spring member 3 being disposed between the forward surface of the sealing ring 2 and forward wall 9a of the groove 9 for constantly biasing the sealing ring 2 backwardly.

It means that the sealing ring 2 can scarcely be deflected by the braking pressure and that a fully large frictional force between the sealing ring 2 and the piston 5 can be advantageously secured; consequently, the piston 5 can be, after the release of braking pressure, returned to a predetermined position with respect to the cylinder 1 regardless of the magnitude of braking pressure and an adequate brake clearance can be naturally assured. In this way an excellent effect from this invention of preventing the drag of the brake and the variation of the braking fluid amount has been proved. Further advantages of this invention shall be described in addition, that is, prevention of a so-called shake back phenomenon from taking place and lengthening of life of sealing rings. As the sealing ring 2 is prevented in the groove 9 from a free axial movement and is retaining the piston 5 with a fully large frictional force, the piston 5 can not be pushed deeper into the cylinder 1 beyond the preset position even when some additional vibration force is applied from outside to the brake, being thus protected from the shake back. As the sealing ring 2 is sustained by a curved surface of the corrugated spring 3 and the spring 3 itself is elastically deflectable, there is little chance when the sealing ring 2 is subjected to an unreasonable local deflection, which leads to a longevity of the same.

Another embodiment is to be described referring to FIG. 8, wherein a spring member is likewise inserted between the sealing ring 2 and the forward wall 9a of the groove 9. The principal difference from the previous embodiment resides in the sectional shape of the spring and the form of the chamfered portion 9d defined on the forward wall 9a of the groove 9. The spring 13 is, although being likewise of annular form as a whole, constructed as shown in FIG. 8 with a flange 13a on the outer periphery and a curved portion 13b on the inner periphery bent toward the same direction as the flange is. The flange portion 13a abuts on the forward wall 9a of the groove 9 for maintaining a predetermined distance therebetween. The curved portion 13b of the spring 13 and the chamfered portion 9e (in FIG. 8) guide the sealing ring 2 smoothly into the groove 9 just in the same way as in the previous embodiment; an axial play between the sealing ring 2 and the groove 9 can also be precluded.

FIGS. 9 and 10 illustrate the operational conditions of this embodiment; the former indicates a case wherein braking pressure is relatively low so that the brake deflection may be neglected. In such a case the piston retracting force is mainly produced by the elastic shear deflection of the sealing ring 2. When the braking pressure is so increased as to cause a brake components deflection the spring 13 will be elastically deflected, as best seen in FIG. 10, to absorb the advance of the piston 5 due to the brake components deflection. Only after the friction pad 6 has been worn so much as not to urge the disk 7 even when the curved portion 13b of the spring 13 abuts on the chamfered portion 9d, a sliding between the sealing ring 2 and the piston 5 will take place, and in turn, the latter will advance with respect to the former, to compensate the wearing of the friction pad.

In this embodiment the advance of the piston 5 corresponding to the brake clearance is chiefly treated by the elastic shear deflection of the sealing ring 2, and the brake components deflection which is proportionally increased with the braking pressure will be mainly absorbed by the elastic deflection of the spring 13, which facilitates the setting of elasticity coefficient of each part, and consequently design and manufacture thereof with a great advantage. This embodiment has been proved to be effective to the same extent as the previous one.

Besides, a spring member 14 provided with only a flange 14a and having no curved portion can also be used, as shown in FIG. 11, with almost the same effect. A spring 16, as illustrated in FIG. 14, having on the annulus parallel wave forms in the radial direction may be used with nearly the same effect.

Spring members are generally liable to be subjected to a large elastic deflection on the break and in the vicinity of the break (see 3f in FIG. 5), those shown in FIGS. 8 and 11 being remarkable in this tendency; for evading this disadvantage it is effective to have somewhat overlapped portions 13c (FIG. 12) therearound.

It is also possible to eliminate the break on the spring member by fitting a ring-formed spring 13 first and then forming the groove by means of a force fit of a ring member 15 on the end of the cylinder.

Although all of these embodiments require the sealing ring 2 to be disposed on the side of cylinder 1, it is also feasible to dispose the groove 9 on the side of piston 5 and fit the sealing ring 2 and the spring member thereinto as shown in FIG. 15. Clearly, any one of the shapes of spring member in accordance with the present invention, including spring members 3 and 14, can be substituted for the spring member 13 as shown in FIG. 15.

Some additional merits of this invention will now be described.

By means of adding only one spring member to the conventional sealing means, or by such extremely simple measures, the drag of the brake and the brake stroke variation or the deterioration of brake operation feeling due to a shake back of the piston or variation of brake fluid amount have been eliminated at a stroke. Moreover, this invention does not require any changes applied in the conventional means, except for the sealing ring and the groove, which does require little increase in weight, space or cost, either. This invention also allows a groove for sealing of relatively low grade finish, which can be counted as one of the innegligible merits.

It will be obvious to those skilled in the art that various changes may be made without departing from the scope of the invention and the invention is not to be considered limited to what is shown in the drawings and described in the specification.

What is claimed is:

1. Sealing means in a disk brake, in which a piston fitted in a cylinder is to urge a friction pad onto a disk rotating with a wheel of a vehicle in order to stop or to decelerate the vehicle, for maintaining the fluid tightness between said piston and said cylinder, said sealing means comprising:

a groove substantially rectangular in section disposed circumferentially on the internal periphery of said cylinder, said groove having a forward wall;

a sealing ring substantially rectangular in section fitted in said groove and having a forward surface; and a spring member disposed between the forward surface of said sealing ring and the forward wall of said groove for constantly biasing said sealing ring backwardly, said spring member being shaped such as to allow a predetermined amount of elastic deflection of said sealing ring due to shear forces caused by relative movement between said piston and said cylinder before causing deflection of said spring member;

wherein the coefficient of friction between said sealing ring and said cylinder is preselected to prevent sliding of said piston relative to said sealing ring until said sealing ring and said spring member have been deflected substantially up to the limit of elastic deflection thereof.

2. Sealing means in a disk brake as set forth in claim 1, wherein the piston is retained at a predetermined axial position by the frictional force between the external peripheral surface of said piston and the internal peripheral surface of said sealing ring, which is fitted in said groove disposed on the internal periphery of said piston cylinder, the piston being allowed a certain preset distance of axial movement by virtue of elastic deflection of said sealing ring and said spring member, and when said distance exceeds the preset limit a sliding between the sealing ring and piston may take place overcoming said frictional force, to automatically compensate for wearing of the friction pad.

3. Sealing means in a disk brake as set forth in claim 2, wherein when an all-out rising of braking pressure is taking place the elastic deflection of said sealing ring itself and a parallel movement of said sealing ring accompanied by the elastic deflection of said spring member progress substantially in parallel fashion to allow a certain preset distance of axial movement of the piston with respect to the piston cylinder.

4. Sealing means in a disk brake as set forth in claim 1, wherein while braking pressure is relatively low, the axial movement of the piston with respect to the piston cylinder is allowed mainly by the elasticity deflection of said sealing ring itself and when braking pressure has risen to cause the sealing ring to be deflected beyond a certain preset limit said relative movement of the piston is allowed simultaneously by the elasticity deflection of said spring member.

5. Sealing means in a disk brake as set forth in claim 1, wherein said spring member is bow-shaped in section.

6. A sealing means in accordance with claim 5 wherein the bow-shaped spring member is disposed in said groove with the convex side thereof abutting said sealing ring and the concave side abutting the forward wall of said groove.

7. A sealing means in accordance with claim 6 wherein said spring member has a slight concavity at the center of the convex side thereof and a corresponding convexity at center of the concave side thereof.

8. Sealing means in a disk brake as set forth in claim 1, wherein said spring member is of annular shape and provided with a flange on the outer periphery and a curved portion on the inner periphery bent in the same direction as is the flange.

9. A sealing means in accordance with claim 8 wherein said spring member is disposed in said groove between the forward wall thereof and said sealing ring with the flange and curved portion directed toward the forward wall of said groove.

10. A sealing means in accordance with claim 9 wherein the internal periphery of the forward wall of said groove is chamfered to correspond to the curved portion of said spring member.

11. Sealing means in a disk brake as set forth in claim 1, wherein said spring member is of annular shape provided with a break in a part thereof.

12. Sealing means in a disk brake as set forth in claim 1, wherein said spring member is of annular shape without a break and retained by a ring member forcedly fitted on the end portion of said cylinder.

13. A sealing means in accordance with claim 1 wherein said spring member is of annular configuration in elevation and is provided with a flange on the outer periphery thereof extending parallel to the axis of said annulus, and wherein a spacious clearance is formed between the internal periphery of said spring member and the external periphery of said piston for allowing a certain amount of elastic deflection of said sealing ring.

14. A sealing means in accordance with claim 1 wherein the internal periphery of the forward wall of said groove is chamfered and wherein said spring member is of annular shape and provided with a flange on the outer periphery, said spring member being disposed in said groove between the forward wall thereof and said sealing ring with the flange directed toward the forward wall of said groove and the remaining portion of said spring member extends inwardly only to the beginning of said chamfered portion.

15. In a disk brake comprising a cylinder, a piston fitted in said cylinder, a friction pad connected to said piston, means for urging said friction pad against a rotating disk in order to decelerate or stop the disk when the brake is applied and piston retracting means for restoring said piston to the original position when the brake is released, the improvement wherein said piston retracting means comprises:

a first spring means and a second spring means both for urging said piston into a fully retracted position and both accommodated in a recess disposed on the internal periphery of said cylinder, said first spring means abutting said cylinder with one end thereof and abutting said piston with the other end thereof, and said second spring means abutting said first spring means with one end thereof and abutting said cylinder with the other end thereof, wherein said spring means are selected such that one of said spring means begins first to elastically deflect upon motion of said piston and the other of said spring means does not begin to elastically deflect before the former has been elastically deflected to a predetermined extent.

16. A disk brake in accordance with claim 15 wherein said first spring means is a sealing ring made of elastic material.

17. Sealing means in a disk brake, in which a piston fitted in a cylinder is to urge a friction pad onto a disk rotating with a wheel of a vehicle in order to stop or decelerate the vehicle, for maintaining the fluid tightness between said piston and said cylinder, said sealing means comprising:

a groove substantially rectangular in section disposed circumferentially on the external periphery of said piston, said groove having a rearward wall;

a sealing ring substantially rectangular in section fitted in said groove and having a rearward surface; and a spring member disposed between the rearward surface of said sealing ring and the rearward wall of said groove for constantly biasing said sealing ring forwardly, said spring member being shaped such as to allow a predetermined amount of elastic deflection of said sealing ring due to shear forces caused by relative movement between said piston and said cylinder before causing deflection of said spring member;

wherein the coefficient of friction between said sealing ring and said cylinder is preselected to prevent sliding of said piston relative to said sealing ring until said sealing ring and said spring member have been deflected substantially up to the limit of elastic deflection thereof.

18. Sealing means in a disk brake as set forth in claim 17, wherein said spring member is bow-shaped in section.

19. Sealing means in a disk brake as set forth in claim 17, wherein said spring member is of annular shape and provided with a flange on the outer periphery and a curved portion on the inner periphery bent in the same direction as is the flange.

20. Sealing means in a disk brake as set forth in claim 17, wherein said spring member is of annular shape provided with a break in a part thereof.

21. Sealing means in a disk brake as set forth in claim 17, wherein the piston is retained at a predetermined axial position by the frictional force between the internal peripheral surface of said cylinder and the external peripheral surface of said sealing ring fitted in said groove disposed on the external periphery of said piston, the piston being allowed a certain preset distance of axial movement by virtue of elastic deflection of said sealing ring and said spring member, and when said distance exceeds the preset limit a sliding between the sealing ring and piston may take place overcoming said frictional force, to automatically compensate for wearing of the friction pad.

22. Sealing means in a disk brake as set forth in claim 21, wherein when an all-out rising of braking pressure is taking place the elastic deflection of said sealing ring itself and a parallel movement of said sealing ring accompanied by the elastic deflection of said spring member progress substantially in parallel fashion to allow a certain preset distance of axial movement of the piston with respect to said piston cylinder.

23. In a disk brake comprising a cylinder, a piston fitted in said cylinder, a friction pad connected to said piston, means for urging said friction pad against a rotating disk in order to decelerate or stop the disk when the brake is applied and piston retracting means for restoring said piston to the original position when the brake is released, the improvement wherein said piston retracting means comprises:

a first spring means and a second spring means both for urging said piston into a fully retracted position and both accommodated in a recess disposed on the external periphery of said piston, said first spring means abutting said piston with one end thereof and abutting said cylinder with the other end thereof, and said second spring means abutting said first spring means with one end thereof and abutting said piston with the other end thereof, wherein said spring means are selected such that one of said spring means begins first to elastically deflect upon motion of said piston and the other of said spring means does not begin to elastically deflect before the former has been elastically deflected to a predetermined extent.

24. A disk brake in accordance with claim 23 wherein said first spring means is a sealing ring made of elastic material.

* * * * *